(12) United States Patent
Thorpe et al.

(10) Patent No.: US 6,889,696 B2
(45) Date of Patent: May 10, 2005

(54) COSMETIC CONTAINER WITH SPRING-BIASED MIRROR

(75) Inventors: Timothy Thorpe, Chislehurst (GB); Jack Rodriguez, Bernardsville, NJ (US)

(73) Assignee: HCT Limited, Hong Kong (CN)

( * ) Notice: Subject to any disclaimer, the term of this patent is extended or adjusted under 35 U.S.C. 154(b) by 0 days.

(21) Appl. No.: 10/410,861

(22) Filed: Apr. 10, 2003

(65) Prior Publication Data

US 2004/0200497 A1 Oct. 14, 2004

(51) Int. Cl.[7] .............................................. A45D 45/02
(52) U.S. Cl. ...................................... 132/287; 132/301
(58) Field of Search ................................ 132/287, 291, 132/301, 302, 303, 304, 305, 306, 316; 206/581, 823, 235, 39.4; 359/841

(56) References Cited

U.S. PATENT DOCUMENTS

| | | | | |
|---|---|---|---|---|
| 1,549,396 A | * | 8/1925 | Vincent | 132/287 |
| 2,099,122 A | * | 11/1937 | Kreisler | 132/303 |
| 2,205,974 A | | 6/1940 | Kramer | 88/97 |
| 2,441,303 A | | 5/1948 | Wesson et al. | 132/79.8 |
| 2,547,971 A | | 4/1951 | Polin et al. | 132/79 |
| 2,582,593 A | | 1/1952 | Kramer | 88/92 |
| 2,771,083 A | | 11/1956 | Darvie | 132/79 |
| 2,783,764 A | | 3/1957 | Loy | 132/83 |
| 3,586,010 A | * | 6/1971 | Landen et al. | 132/287 |
| 4,852,727 A | * | 8/1989 | Oberle | 206/39.4 |
| 4,932,547 A | * | 6/1990 | Rodriguez | 220/8 |
| 5,054,505 A | | 10/1991 | Yuhara | 132/294 |
| 5,163,457 A | * | 11/1992 | Lombardi, Jr. | 132/304 |
| 5,398,706 A | | 3/1995 | Epstein | 132/294 |
| 6,070,702 A | | 6/2000 | Der Kinderen | 190/109 |
| 6,085,759 A | * | 7/2000 | Joulia | 132/293 |
| 6,095,334 A | | 8/2000 | Belveal et al. | 206/581 |

FOREIGN PATENT DOCUMENTS

EP          03253854.8          2/2004

* cited by examiner

Primary Examiner—Todd E. Manahan
(74) Attorney, Agent, or Firm—Norris, McLaughlin & Marcus

(57) ABSTRACT

A cosmetic container with spring-biased mirror is provided. The cosmetic container has a lower compartment containing a mirror frame and mirror concealed within. The mirror frame is held in place against the force of the spring by a first flexible hinge which abuts a sidewall of the lower compartment. When the user desires to access the mirror, they press downwards upon a second flexible hinge in the tray of the container which holds the cosmetic. The flexible hinge in the tray is in relationship with the flexible hinge in the mirror frame. Thus, a downwards force applied to the flexible hinge in the tray transmits the downward force to the flexible hinge in the mirror frame. This force disengages the flexible hinge in the mirror frame from the sidewall of the lower compartment, thus permitting the spring to urge the mirror frame and mirror from their concealed position to their exposed position where the mirror is available for use.

12 Claims, 5 Drawing Sheets

COSMETIC CONTAINER WITH SPRING-BIASED MIRROR

BACKGROUND OF THE INVENTION

The present invention relates generally to a compact case for cosmetics. More particularly, the invention relates to a compact case having a spring-biased mirror within its base, the mirror in its closed position being concealed within the base and out of communication with the cosmetic powder held within the receptacles of a tray overlaying the base. In operation, the user opens the lid of the compact overlaying the tray and depresses a flexible latch within the tray whereupon the mirror is projected by a spring to an exposed position outside of the base of the compact where it is readily available for access by the user.

Cosmetic holding cases or compacts with manually slidable or movable mirrors are known in the art. U.S. Pat. No. 2,205,974 to Kramer discloses a cosmetic holding device wherein the mirror is contained within the case and is slidable out of the interior of the case from its normally concealed position to a position where it can be observed by the user by grasping the edges thereof. After use, the mirror can be retracted to its normal concealed position by applying pressure thereto with the fingers. U.S. Pat. No. 2,582,593 to Kramer discloses an improved compact featuring the utilization of a slidably guided mirror adapted to be manually withdrawn from the closing cover of the compact. U.S. Pat. No. 5,398,706 to Epstein also discloses a compact case, here incorporating a pull out tray in the bottom compartment thereof for holding cosmetic components including a mirror.

A lady's compact case incorporating a spring-loaded mirror therein is disclosed by U.S. Pat. No. 2,783,764 to Loy. This reference is to a compact having a normally concealed mirror which may be moved from its concealed position to an exposed position by a spring when a user moves a locking member attached to the mirror from its offset position in a locking slot disposed within the bottom of the case. The return of the mirror from its exposed position to its concealed position is effected by pushing the locking member backwards against the force exerted by the spring until the locking member has attained a position adjacent the locking slot whereby sidewards pushing of the locking member into the locking slot by the user effects the retention of the mirror in its locked position. One drawback of this invention is that the closing operation is clumsy and requires manual dexterity of the fingers which many older users of the compact may lack. Additionally, the appearance of a slot in and across almost the entirety of the width of the back of the case, with the locking member protruding there though, is unsightly and presents a means by which dirt or grit may enter the bottom of the compact and impair the operation of the slidable mirror. This slot also allows for snagging of the locking member on other articles within a purse or pocket thus increasing the likelihood of an accidental opening of the mirror.

U.S. Pat. No. 2,771,083 to Darvie also presents a retractable mirror device, here associated with the use of a lipstick holder. In this device, the partial retraction or complete removal of a lipstick holder from a container associated with and in communication with the mirror via a latch, releases the spring-biased mirror for movement into its visible position. This invention, however, also presents several disadvantages. For example, in this device the mirror is only held in its closed position when the lipstick holder is disposed within its container. Thus, the user is unable to return the mirror to its closed position if the user desires to continue to use the lipstick holder by itself. Additionally, the mirror is always automatically released to its exposed position upon the removal or partial removal of the lipstick holder from its container. Thus, the user cannot use the lipstick alone without the mirror being projected out, even if the mirror is not desired to be used.

BRIEF SUMMARY OF THE INVENTION

The present invention is a compact case for cosmetics having a spring-biased mirror within its base. In its closed position the mirror is concealed within the base of the compact and is out of communication with the cosmetic powder contents of the compact which are held within the receptacles of a tray overlaying the base. When the user desires access to the mirror, the user opens the lid of the compact and depresses a button in the form of a flexible latch within the tray whereupon the mirror is projected outside of the compact by a spring for ready access by the user.

It is an object of the present invention to overcome the problems of the prior art by providing a compact case with a spring-biased mirror which provides a simple means for securing the mirror in its closed, concealed position.

It is a further object of the present invention to eliminate the projection of any securing means outside of the cosmetic case to reduce the likelihood of the mirror being accidentally released to its exposed position.

It is yet another object of the present invention to eliminate any large openings within the cosmetic case when the mirror is in its closed, concealed position which might serve as a conduit for the entry of dirt into the spring mechanism.

It is still yet a further object of the present invention to provide a cosmetic case with a spring-biased mirror wherein the user can access the cosmetic without triggering the mirror to move into its exposed position.

These and other objects of the invention are met by the invention disclosed herein. The cosmetic case comprises a generally square-shaped base fabricated preferably of plastic having an upper compartment or tray containing one or more receptacles for the storage of cosmetics, such as blush, and an applicator brush. Directly beneath the tray is disposed a lower compartment within the base wherein resides a mirror supported within a mirror frame. The mirror frame is attached at one of its ends to one or more compression springs which are attached to a side wall of the lower compartment. The mirror frame rests between a substantially parallel pair of guide tracks protruding from the bottom wall of the lower compartment. Integrally molded on opposed sides of the mirror frame are a pair of stop tabs. These stop tabs serve to prevent the mirror frame from being completely ejected outside of the lower compartment by the action of the spring.

The mirror frame is retained in its concealed position within the lower compartment against the biasing force of the compressed spring by means of a flexible latch disposed in the mirror frame. In this concealed position, the leading edge of the flexible latch in the mirror frame abuts against a sidewall of the lower compartment, thus holding the frame in place. To permit the spring to slidably move the mirror frame and mirror laterally from its concealed position to its exposed position outside of the base, a second flexible latch disposed in the tray directly above and either in close proximity or direct communication with the flexible latch in the mirror frame when the mirror frame is in its concealed position, is pressed downward by the user toward the mirror frame. In this manner the flexible latch of the tray depresses the flexible latch within the mirror frame such that the leading edge of the flexible latch in the mirror frame is forced out of communication with the sidewall of the lower compartment. With resistance to lateral movement of the mirror frame thus removed, the compressed spring(s) uncoils and urges the mirror frame and its associated mirror along the guide tracks until the stop tabs on opposed sides of the mirror frame come into contact with a sidewall of the lower compartment. This contact stops the lateral movement of the mirror frame but not until the mirror is in its exposed position.

Hingedly attached to the base is a cover, preferably of transparent plastic, which in its closed position fits over the base and protects the cosmetics contained within the receptacles of the tray from exposure to dirt, dust and precipitation and, in its open position, provides ready access to the cosmetics by the user.

In normal operation the cosmetic container is transported in a purse, pocket or other carrying means with the cover in its closed position and the mirror in its retracted, concealed position inside of the lower compartment. When access to the cosmetic and/or the mirror is desired, the hinged cover is moved to its open position. If the user desires access to the mirror to aid in application of the cosmetic to the face, the flexible latch disposed in the tray is depressed. This downward movement of the flexible latch in the tray creates an associated downward movement of the underlying flexible latch disposed within the mirror frame thus removing the leading edge of the flexible latch in the mirror frame from its engagement with a sidewall of the lower compartment. The spring thus urges the mirror frame and mirror into its exposed position outside of the case.

After the application of the cosmetic to the face is complete, the cover is typically moved to its closed position and the mirror frame returned to its concealed position within the lower compartment upon the application of a slight lateral force to the frame by the fingers in a direction opposed to the force of the spring so as to again compress the spring. As the frame is slid by this force so that it is returned to the lower compartment, the flexible latch of the mirror frame again engages the sidewall of the lower compartment thereby retaining the mirror frame in its concealed position against the force of the compressed spring until its next use.

In accordance with the foregoing objects, a compact case for cosmetics having a spring-biased mirror within its base is disclosed which overcomes the problems associated with the prior art.

The novel aspects of the invention are set forth with particularity in the appended claims. The invention itself, together with further objects, features, aspects and advantages will be readily apparent to those skilled in the art and a better understanding of the present invention may be had by reference to the following detailed description taken in connection with the following drawings.

DETAILED DESCRIPTION OF THE INVENTION

Figure 1:
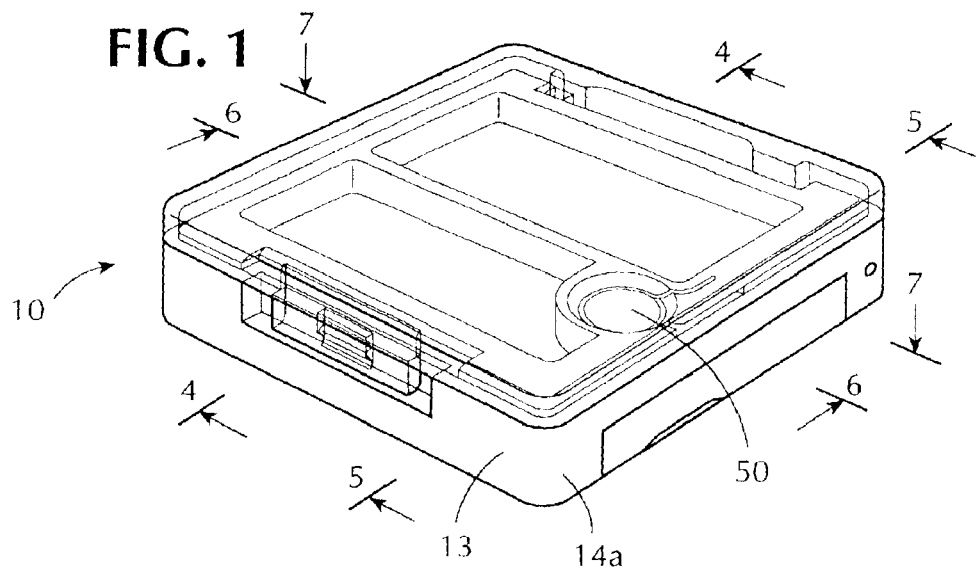
FIG. 1 is a front perspective view of the cosmetic container with spring-biased mirror depicting the cover in its closed position and the mirror in its concealed position.
Figure 2:
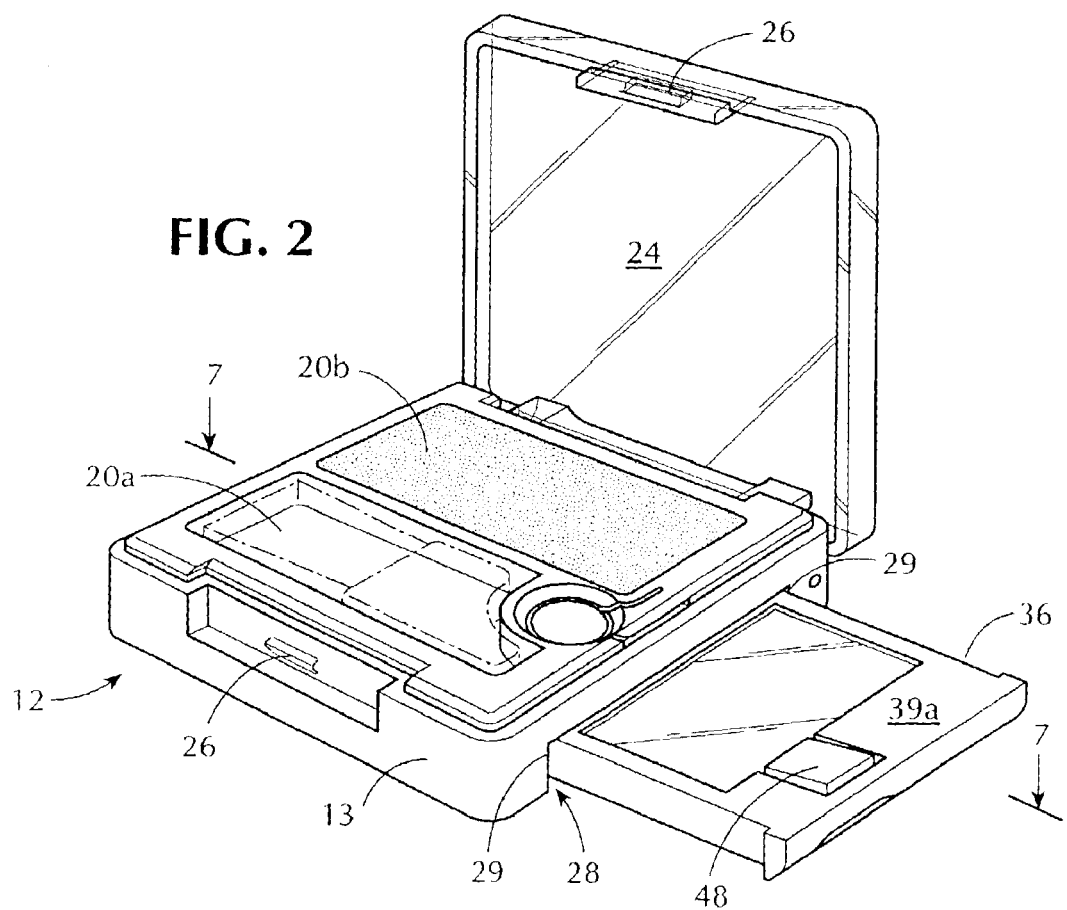
FIG. 2 is a front perspective view of the cosmetic container with spring-biased mirror depicting the cover in its open position and the mirror in its exposed position.
Figure 3:
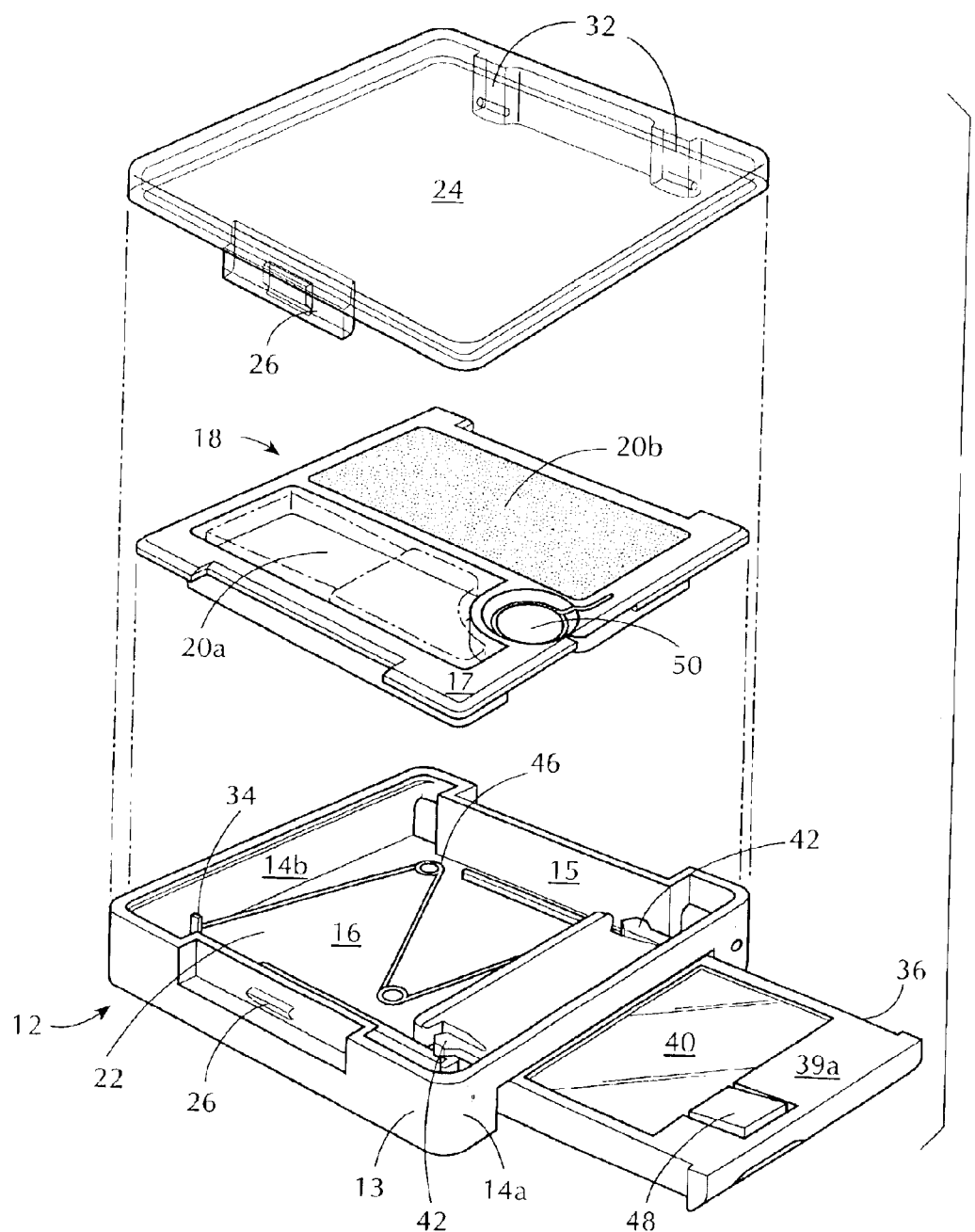
FIG. 3 is an exploded front perspective view of the cosmetic container with spring-biased mirror.
Figure 4:
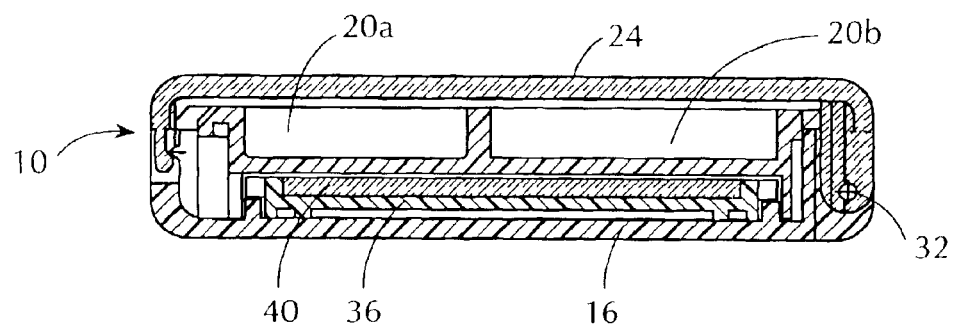
FIG. 4 is a cross-sectional view of the cosmetic container with spring-biased mirror taken along line 4—4 of FIG. 1.

Referring now to the drawings there is shown in FIGS. 1, 2 and 3 a cosmetic container with spring-biased mirror. The cosmetic container 10 includes a preferably generally square-shaped base 12 having a front wall 13, two sidewalls 14a, 14b, a rear wall 15 and a bottom wall 16. Overlaying base 12 is a tray 18 having one or more receptacles 20a, 20b disposed therein for the storage of cosmetics and an applicator brush. The bottom wall 16 is in contact with and connected to front wall 13, each of the sidewalls 14, and the rear wall 15. The front, rear and side walls are also in contact with and connected to the tray 18 to form a lower compartment 22 within base 12. A generally square-shaped lid 24 is hingedly attached to the rear wall 15. The lid 24 and the front wall 13 are provided with mating locking elements 26 of conventional design for effectuating the closure of the lid 24 of the compact 10. It will be understood by those of ordinary skill in the art that the shape of the base 12 and lid 24 need not be generally square but may, alternatively, be generally rectangular, circular or of other geometric shape.

The cosmetic container 10 is preferably formed from moldable plastic, such as acrylonitrile butadiene styrene ("ABS") or the like, which makes the cosmetic container easy to manufacture using standard injection molding techniques. Lid 24 is preferably constructed of clear or transparent plastic such as styrene acrylonitrile ("SAN") or the like.

Front wall 13, sidewalls 14a, 14b, rear wall 15 and bottom wall 16 are preferably molded together to form a one piece base 12. Lid 24 is separately molded and is attached to rear wall 15 by one or more hinges 32. One of the sidewalls 14a contains an elongated rectangular-shaped opening 28 formed therein. Protruding from the bottom wall 16 into the lower compartment 22 formed by the front wall 13, sidewalls 14a, 14b, rear wall 15, bottom wall 16 and tray 18 are a pair of guide tracks 30a, 30b (see FIG. 8) oriented substantially parallel to each other and substantially perpendicular to opening 28 in sidewall 14a. On the sidewall 14b which is opposed to the sidewall 14a having the opening 28 disposed therein are formed one or more pins 34 (see FIG. 7) or other attaching means for purposes as will be further described.

Figure 8:
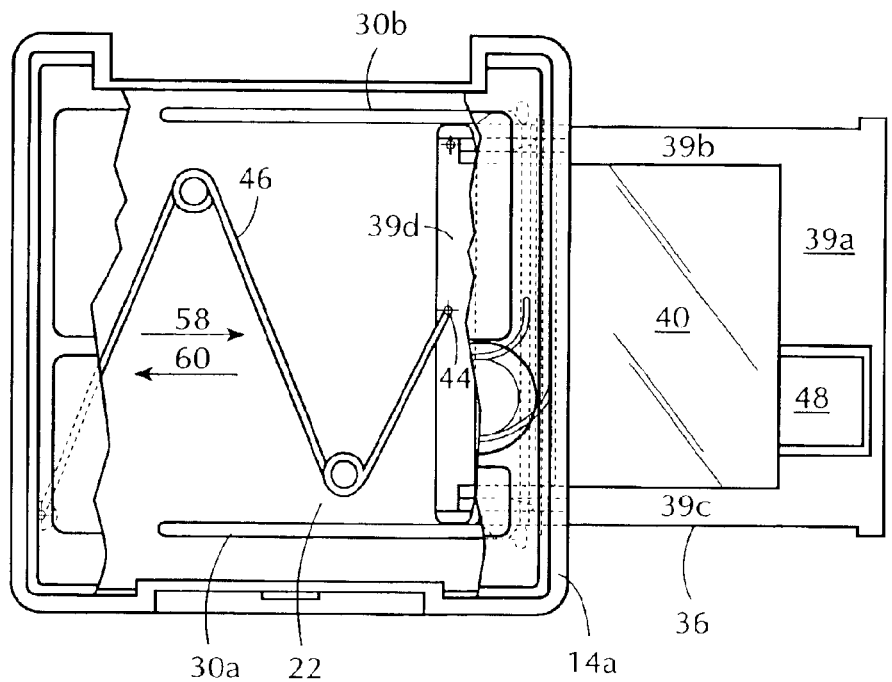
FIG. 8 is a top plan view of the cosmetic container with spring-biased mirror with the mirror in its exposed position and fragments of the tray removed for clarity to expose the spring contained within the lower compartment.
Figure 10:
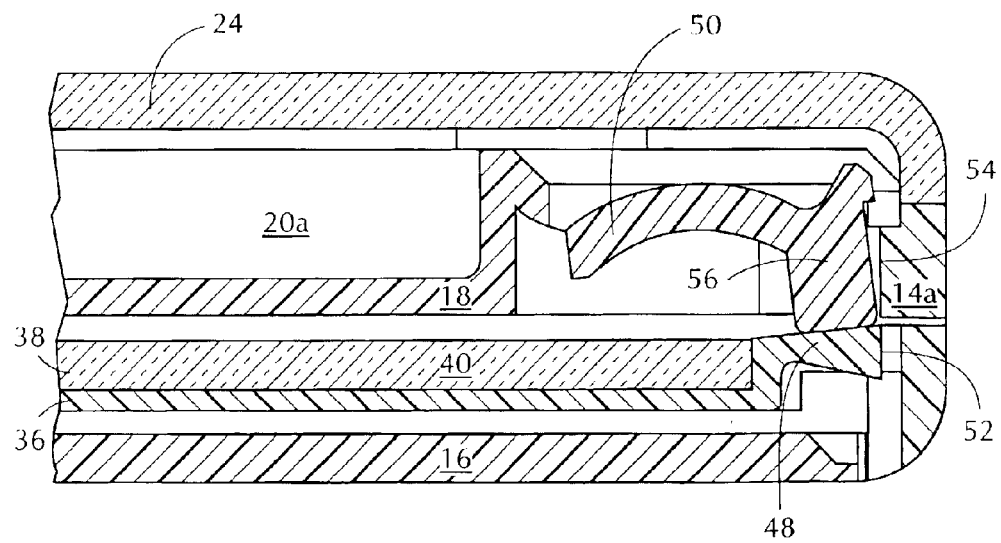
FIG. 10 is a magnified view of the relationship between the flexible latch in the mirror frame and the overlaying flexible latch in the tray taken along line 6—6 of FIG. 1 with the flexible latch in the tray depressed and the flexible latch in the mirror frame depressed thus removing the leading edge of the flexible latch in the mirror frame from communication with the sidewall of the lower compartment.

Referring to FIG. 8, disposed within the lower compartment 22 between the pair of guide tracks 30 is a mirror frame 36. The mirror frame is formed of plastic, preferably ABS, with a recessed portion 38 (see FIG. 10) therein defined by flanges 39a,b,c,d for retaining and supporting a mirror 40 within the mirror frame 36. Transverse play or chatter of the mirror frame 36 is precluded by the guide tracks 30 since both of the latter closely although movably confine the mirror frame 36. Displacement of the mirror frame 36 widthwise of the lower compartment 22 is also prevented by the side edges 29 (see FIG. 2) of the elongated opening 28 which closely straddle the sides of the mirror frame 36 although permitting the latter to be displaced in and out of the lower compartment 22 through opening 28.

Integrally molded on opposed sides of the mirror frame are stop tabs 42. (see FIGS. 3 and 7). Also integrally molded in the flange of the mirror frame farthest from opening 28 is pin 44 (see FIG. 8) or other attaching means for purposes as will be further described. Molded within the flange 39a of mirror frame 36 which is oriented closest to opening 28 is a first flexible latch 48. This flexible latch 48 is formed in the flange 39a by removing a portion of plastic in the flange to create a latch of any form or shape which remains secured to the flange but which by virtue of the removal of the surrounding plastic material can also be depressed or flexed by downward force applied by a user. When the downward force is lessened or removed, the flexible latch 48 rebounds and returns to its original position relative to flange 39a. This cycle can be repeated numerous times without failure of the latch.

Figure 7:
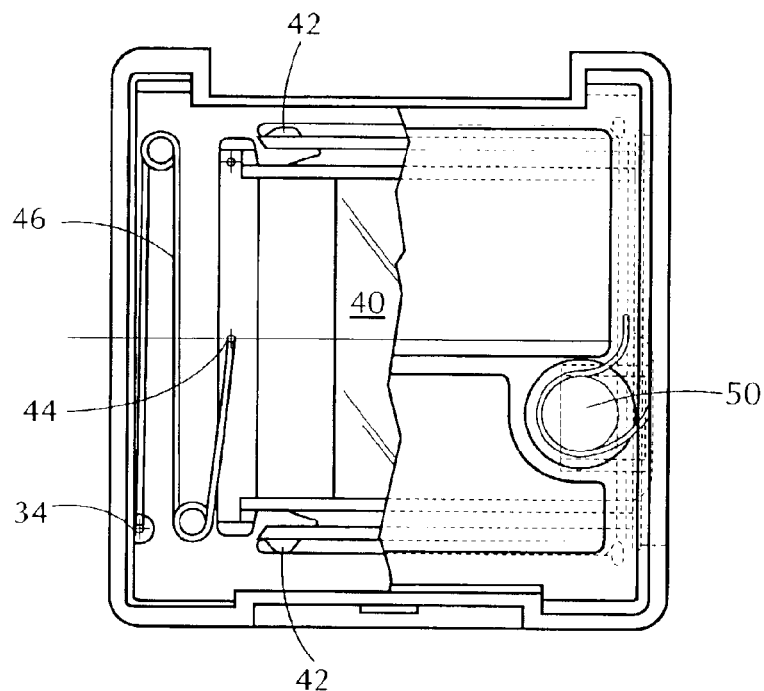
FIG. 7 is a top plan view of the cosmetic container with spring-biased mirror taken along line 7—7 of FIG. 1 with fragments of the tray removed for clarity to expose the spring, mirror and mirror frame contained within the lower compartment.

Also disposed within the lower compartment 22 are one or more compression springs 46. Referring to FIGS. 7 and 8, the distal end of spring 46 is secured to a pin 34 of sidewall 14b and the opposed proximate end of each spring 46 is secured to a pin 44 of mirror frame 36. It is to be understood that the number of compression springs, the geometry of the compression springs and the materials of construction of the compression springs employed are not to be construed as a limitation of the invention. While one compression spring is preferred and illustrated in the figures, two springs or more than two springs could just as easily be used and still be within the spirit and scope the invention.

Overlaying the lower compartment 22 is tray 18. Formed within the upper side 17 of tray 18 are one or more receptacles 20a, 20b for the storage of cosmetics and an applicator brush. Also formed within tray 18 is a second flexible latch 50 (see FIG. 3). In the position where the mirror frame 36 is in its concealed, retracted position, the second flexible latch 50 overlays and is either close to or in contact with the first flexible latch 48 formed within flange 39a of mirror frame 36. The second flexible latch 50 is formed in the same manner as the first flexible latch 48. When downward force is applied to the second flexible latch 50 it deflects or flexes downward from the horizontal. When the downward force is lessened or removed, the second flexible latch 50 rebounds and returns to its original position. This cycle can be repeated numerous times without failure of the latch to rebound.

Figure 5:
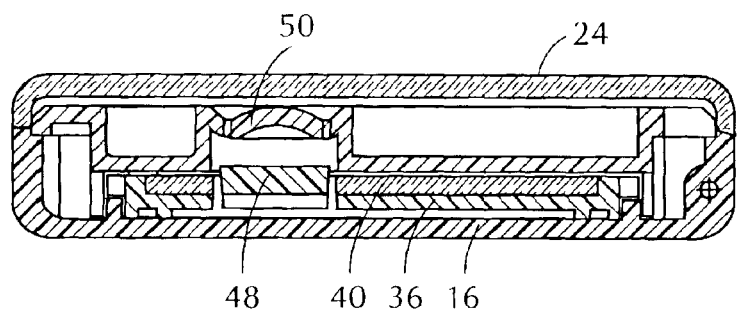
FIG. 5 is a cross-sectional view of the cosmetic container with spring-biased mirror taken along line 5—5 of FIG. 1.
Figure 9:
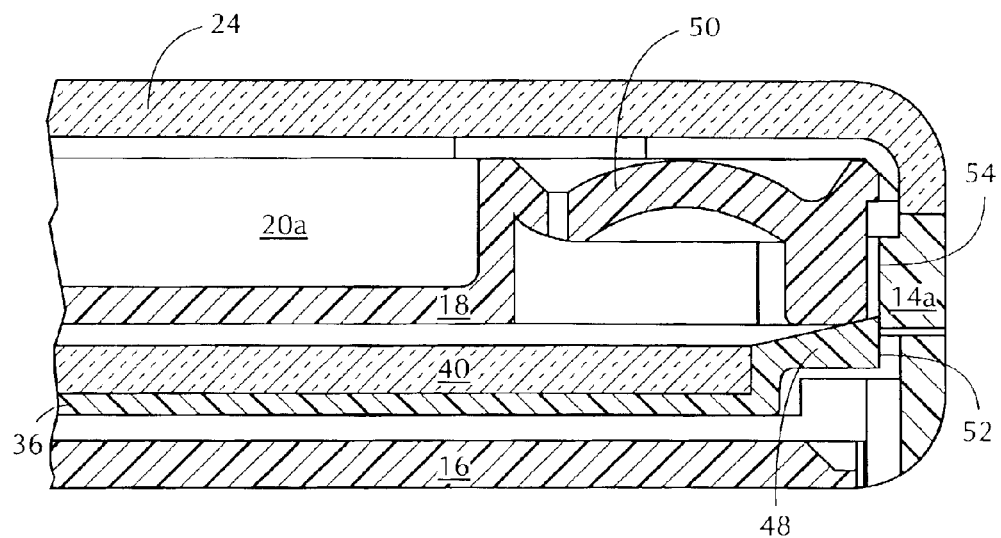
FIG. 9 is a magnified view of the relationship between the flexible latch in the mirror frame and the overlaying flexible latch in the tray taken along line 6—6 of FIG. 1 when the mirror is in its concealed position and the leading edge of the flexible latch in the mirror frame is in communication with the sidewall of the lower compartment.

The operation of the cosmetic container 10 is hereafter described. While being transported by a user, the lid 24 is closed and secured to front wall 13 by locking elements 26. The mirror frame 36 and mirror 40 are in their normally concealed position within the interior of the lower compartment 22, positioned between the pair of guide tracks 30 protruding from the bottom wall 16. The spring 46 is compressed between the mirror frame 36 and a sidewall 14b of the base 12. The spring 46 and the mirror frame 36 are held in position against the force of the compressed spring 46 by the juxtaposition of the leading edge 62 of the first flexible latch 48, located in a flange 39a of the mirror frame 26, against the inner surface 54 of the sidewall 14a having an opening 28 formed therein. (See FIGS. 5 and 9).

Figure 6:
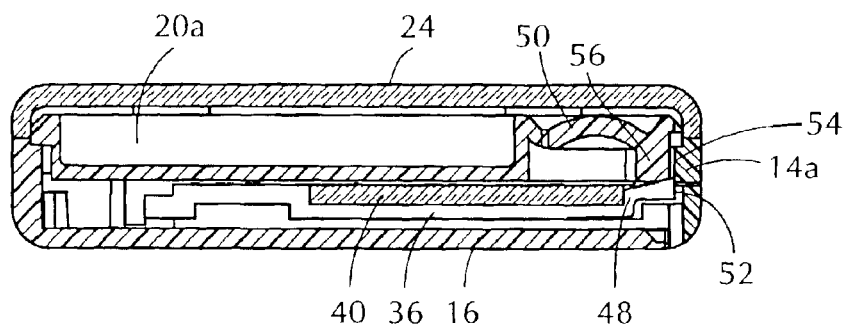
FIG. 6 is a cross-sectional view of the cosmetic container with spring-biased mirror taken along line 6—6 of FIG. 1.

When the user desires access to the cosmetic, they release the locking elements 26 and open the lid 24. Should the user also desire to use the mirror 40 to aid in the application of the cosmetic to the face, the user depresses the second flexible latch 50 located in the tray 18 by the application of a slight downward force in the direction of the bottom wall 16. (See FIGS. 6 and 10). By this motion, leg 56 of the second flexible latch bears downward upon the first flexible latch 48 located in the mirror frame 36 with sufficient force to move and disengage the leading edge 52 of the first flexible latch 48 out of its abutting communication with the inner surface 54 of sidewall 14a. Referring to FIG. 8, with resistance to lateral movement of the mirror frame 36 thus removed, the compression spring 46 uncoils and urges the mirror frame 36 carrying the mirror 40 laterally between the pair of guide tracks 30 and expels the mirror frame 36 out of opening 28 in the lower compartment 22 in the direction of arrow 58 until the stop tabs 42 strike the inner surface 54 of sidewall 14a (see FIG. 3), thus limiting the expulsion of the mirror frame 36 and retaining a portion of the mirror frame 36 within the lower compartment 22. In this manner the mirror 40 is slidably moved from its concealed position into its exposed position and the mirror frame 36 is prevented from being ejected entirely from the lower compartment 22.

Once the user stops depressing the second flexible latch 50 in tray 18, the flexible latch 50 rebounds and returns to its original position before downward pressure was applied. Similarly, once the leading edge 52 of the first flexible latch 48 in the mirror frame 36 passes through opening 28, it rebounds and returns to its original position.

When the user has completed their use of the mirror 40, the mirror frame 36 may conveniently be retracted to its normal concealed position within the lower compartment 22 by the application of slight lateral pressure against the frame by the user's fingers. The mirror frame 36 is thus moved laterally backwards in the direction of arrow 60 (FIG. 8) through the opening 28 in sidewall 14a against the force of the compression spring 46 until the leading edge 52 of the first flexible latch 48 in the mirror frame 36 is again juxtaposed against the inner surface 54 of sidewall 14a and the leg 56 of the second flexible latch 50 in the tray 18 is in contact with the first flexible latch 48. The user may close the lid 24 so that it mates with locking elements 26 either before or after the mirror frame 36 is returned to its concealed position.

In this manner a cosmetic container with spring-biased mirror is provided which readily avoids the problems and shortcomings associated with the prior art. The present invention provides a simple means for securing the mirror frame 36 and mirror 40 in a closed, concealed position. The present invention eliminates the projection of any securing means outside of the cosmetic container 10, thus reducing the likelihood of the mirror frame 36 and mirror 40 being accidentally released to the exposed position. There are no large openings in the cosmetic container 10 when the mirror frame is in its closed, concealed position which might serve as a conduit for the entry of dirt into the lower compartment 22 where it can interfere with the operation of the compression spring 46. Finally, the user of the cosmetic container 10 can access the cosmetic without triggering the mirror 40 to move into its exposed position.

The preferred embodiment has been illustrated and described. Further modifications and improvements may be made thereto as may occur to those skilled in the art and all such changes as fall within the true spirit and scope of this invention are to be included within the scope of the claims to follow.

What is claimed is:

1. A cosmetic container, comprising:

a base having an inner compartment formed therein;

a mirror frame comprising and supporting a mirror, said mirror frame disposed inside said inner compartment in a retracted position, wherein said mirror frame is capable of sliding laterally inside said inner compartment to extend from said retracted position to an exposed position outside of said inner compartment;

a biasing means to forcibly extend said mirror frame from said retracted position inside said inner compartment in said base to said exposed position;

a first flexible latch in said mirror frame enabling said mirror frame to maintain said retracted position inside of said inner compartment; and a tray overlaying said inner compartment, said tray containing a receptacle and a second flexible latch capable of communicating with said first flexible hinge;

wherein said first flexible latch in said mirror frame comprises a leading edge which abuts a sidewall of said inner compartment when said mirror frame is in said retracted position and enables said mirror frame to remain in said retracted position against the force of said biasing means and where upon depression of said second flexible latch in said tray a leg of said second flexible latch bears downward upon said first flexible latch in said mirror frame with sufficient force to move and disengage said leading edge of said first flexible latch out of abutting communication with said inner surface of said sidewall enabling said mirror frame to be forcibly biased from said retracted position to said exposed position.

2. The cosmetic container of claim 1, wherein said biasing means comprise a spring.

3. The cosmetic container of claim 1, further comprising guide tracks within said inner compartment wherein said mirror frame is positioned between said guide tracks when said mirror frame is in said retracted position.

4. The cosmetic container of claim 1, wherein said mirror frame further comprises stop tabs for securing one end of said mirror frame within said inner compartment when said mirror frame is forcibly extended by said biasing means to said exposed position.

5. The cosmetic container of claim 1, further comprising a lid.

6. The cosmetic container of claim 1, wherein said lid is hingedly attached to said base.

7. The cosmetic container of claim 5, wherein said lid is transparent or translucent plastic.

8. The cosmetic container of claim 1, wherein said base, tray, mirror frame and first and second flexible latches are made of plastic.

9. The cosmetic container of claim 8, wherein said plastic is acrylonitrile butadiene styrene.

10. The cosmetic container of claim 1, wherein a cosmetic is contained within said receptacle.

11. The cosmetic container of claim 1, wherein said base is square-shaped.

12. The cosmetic container of claim 3, wherein said guide tracks are substantially parallel to one another.

* * * * *

UNITED STATES PATENT AND TRADEMARK OFFICE
CERTIFICATE OF CORRECTION

PATENT NO.    : 6,889,696 B2
DATED         : May 10, 2005
INVENTOR(S)   : Thorpe et al.

It is certified that error appears in the above-identified patent and that said Letters Patent is hereby corrected as shown below:

Column 6,
Line 9, "leading edge 62" should read -- leading edge 52 --.

Signed and Sealed this

Thirteenth Day of September, 2005

JON W. DUDAS
*Director of the United States Patent and Trademark Office*